United States Patent [19]
Ekstrom

[11] 3,962,623
[45] June 8, 1976

[54] DIRECT CURRENT TRANSMISSION WITH TWO PARALLEL CIRCUITS

[75] Inventor: Ake Ekstrom, Ludvika, Sweden

[73] Assignee: Allmanna Svenska Elektriska Aktiebolaget, Vasteras, Sweden

[22] Filed: Nov. 21, 1974

[21] Appl. No.: 526,067

[30] Foreign Application Priority Data
Dec. 21, 1973  Sweden .............................. 7317337

[52] U.S. Cl. ................................. 321/27 R; 333/3
[51] Int. Cl.² ............................................ H02M 7/00
[58] Field of Search .......... 235/151.21; 321/2, 27 R; 333/3

[56] References Cited
UNITED STATES PATENTS

| | | |
|---|---|---|
| 3,526,780 | 9/1970 | Uhemann et al. .................... 321/2 |
| 3,536,930 | 10/1970 | Stackegard ......................... 307/82 |
| 3,543,045 | 11/1970 | Hammarlund et al. ............... 307/82 |

*Primary Examiner*—William M. Shoop

[57] ABSTRACT

A direct current transmission system includes two separate parallel transmission circuits each including convertors. The transmission circuits are bipolar. One pole of one of the circuits is provided with pole reversing switches for the convertors of that pole. The poles of each of the circuits are connected in parallel by transmission lines. Switches are provided by which one of the transmission lines of one circuit can be disconnected from that circuit and connected across a faulty transmission line of the other circuit, which meanwhile is disconnected therefrom, so as to substitute for the disconnected transmission line of the second circuit.

1 Claim, 1 Drawing Figure

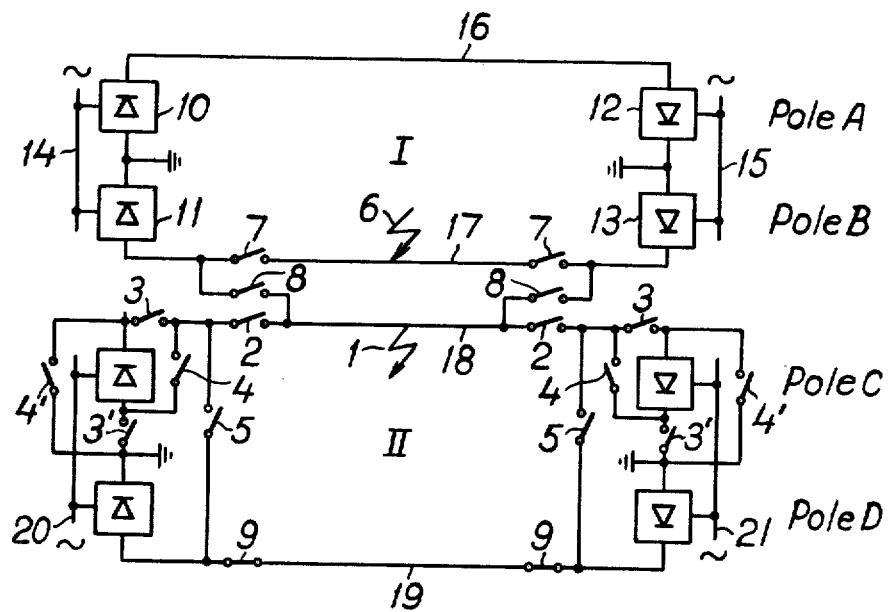

DIRECT CURRENT TRANSMISSION WITH TWO PARALLEL CIRCUITS

BACKGROUND OF THE INVENTION

1. Field of the Invention

The present invention relates to a direct current transmission comprising two separate, parallel transmission circuits, at least one of them being bipolar.

2. The Prior Art

Such a transmission may occur, for example, where a first transmission circuit is associated with a second for increasing the transmission capacity but where it is desirable to keep the two circuits separated from each other to avoid confusing their control systems or their main networks. Another possibility may be that the two circuits are positioned adjacent to each other but still at such a distance from each other that it seems reasonable to keep them separated during normal operation.

By a bipolar transmission circuit is meant a transmission circuit comprising two convertor stations with earthed center taps and connected by way of two conductors with positive and negative polarity, respectively. A pole in such a circuit consists of one conductor and the appropriate convertors in the two stations.

In such a circuit it is known to utilize the transmission conductors as reserves for each other by arranging pole reversers for the convertors in at least one pole and reversing switches for parallel connection of the two poles of the circuit by way of a transmission line. This is made possible by the fact that the transmission lines (transmission conductors) normally have a considerably greater overload capacity than the convertors. A prerequisite for being able to carry out such a pole changing is that the reversible convertors are insulated for full voltage on both terminals, whereas it is usual that the terminal which is normally connected to earth is uninsulated or only rather weakly insulated.

Both the reversing switches, which are normally isolating circuit breakers, and the complete insulation are, however, expensive and the present invention aims at achieving a mutual reserve for the various lines in the above-mentioned parallel transmission circuits with the least possible use of switches and insulation.

SUMMARY OF THE INVENTION

According to the invention this is performed by providing, in a transmission which includes two bipolar transmission circuits, reversing means for the convertors in at least one of the poles of the second transmission circuit. The circuits have transmission lines connecting the poles of each of the transmission circuits in parallel. Means are provided for disconnecting one of the transmission lines of the second transmission circuit from the circuit, and for disconnecting a faulty transmission line of the first circuit, as well as means to connect the disconnected transmission line of the second circuit to the first circuit across the disconnected faulty transmission line thereof.

This provides a mutual line reserve for all poles in the two circuits which can be achieved by making only one pole of one circuit reversible.

BRIEF DESCRIPTION OF THE DRAWING

In other respects the invention will be further described with reference to the accompanying drawing showing a direct current transmission according to the invention.

DESCRIPTION OF THE PREFERRED EMBODIMENTS

The direct current transmission consists of two separate circuits I and II which are arranged substantially in parallel. Each circuit consists of two convertor stations each connected to an AC network. In the circuit I each station consists of two convertors 10, 11 and 12, 13, respectively, connected to the AC networks 14, 15. The two stations each have an earthed center tap and are connected to each other by way of DC conductors 16, 17. Similarly, the circuit II consists of two stations with two rectifiers each connected to an AC network 20, 21 and connected to each other by way of DC conductors 18, 19. In this way the transmission will comprise four poles A-D, each pole consisting of a DC conductor with a convertor at each end. Often there are two or more convertors in series or parallel at the end of each pole, but for the sake of simplicity only one has been shown.

In the circuit II, switching members 2, 3, 3', 4, 4', 5 and 9 are shown as well as switching members 7 in circuit I and 8 between circuits I and II, by means of which the various DC conductors may be switched in as reserves for each other. The switching members are usually designed as isolating switches. During normal operation the switches 2, 3, 3', 7 and 9 are closed whereas 4, 4', 5 and 8 are opened. The circuits I and II then each form one closed circuit independent of the other.

In the event of a fault on a DC conductor in the circuit II, for example at 1 on the conductor 18, the switching members 2, 3 and 3' are opened whereas members 4, 4'to and 5 are closed. In this way the convertors in pole C will be parallel connected with the convertors in pole D and the power transmission in circuit II can be maintained with all convertors in operation over the conductor 19 and earth. Before the switching the convertors in pole C are made currentless and after switching they are deblocked. The convertors in pole D, on the other hand, can continue their undisturbed operation during the entire switching procedure if the correct deblocking sequence is secured so that the current margin between the control setting of the stations is maintained, as described in U.S. Pat. No. 3,526,780.

It will be seen that, when the switching members 3, 3' are opened and 4, 4' and 5 are closed, the convertors in poles C and D are parallel connected. It is thereafter possible to join the stations in the circuit II by way of any of the conductors 18 or 19. The only difference is that in the above-mentioned example the switching can take place without the faultless pole D having to be affected by the switching, whereas if a fault occurs on the pole D the pole C must be blocked during the switching before the poles C and D can be brought into operation again. If such a stoppage can be allowed, it is sufficient to provide a switching equipment in only one of the poles C and D. Otherwise it is necessary to have switches in both poles. As mentioned earlier this involves, on the one hand, a double set of switches and, on the other, means that the convertors in both poles must have full insulation on both sides.

By equipping the circuit II with switches as shown, it can also be used as a reserve for the circuit I without requiring in the circuit switching equipment of its own or a double-sided insulation. For this purpose the isolating switches 7 and 8 are introduced.

If the poles C and D are parallel connected by opening the isolating switches 2, 3 and 3' and closing the isolating switches 4, 4' and 5, the line 18 will be available as a reserve line for the ciruit I. Therefore, if a fault occurs on, for example, line 17 at 6, this line can be replaced by 18 by opening the isolating switches 7 and closing the isolating switches 8. In a similar way the line 16 can be provided with switching members corresponding to 7 and 8.

Thus it is seen that the invention permits full reserve for each conductor by making only one pole reversible.

The different switching can be carried out by hand in response to signals, but are suitably performed automatically, for example on a signal from line protection devices of known kinds. The various steps in the switching sequences can therefore be programmed in a control device which brings about the switchings step by step.

The invention can be applied to more than two parallel circuits, and it can also be applied if the circuit I is unipolar, the pole A being completely omitted.

I claim:

1. Direct current transmission comprising first and second separate parallel transmission circuits (I and II) each comprising convertors, at least the second of the transmission circuits being bipolar, pole reversing means (3, 3', 4, 4') for the convertors in at least one pole (C) of the second transmission circuit (II), transmission lines (16, 17, 18, 19) connecting the poles of each of the transmission circuits in parallel, means (2) for disconnecting a first of the transmission lines (18) of the second transmission circuit from the circuit, means (7) for disconnecting one of the transmission lines (17) of the first transmission circuit from the circuit, reversing switches (5) for connecting at least two of the poles of the second transmission circuit through the second transmission line (19) thereof, and means (8) for connecting the disconnected transmission line (18) of the second circuit with the first circuit across the disconnected transmission line (17) of the first circuit.

* * * * *